United States Patent
DiGiovanni et al.

(10) Patent No.: US 10,684,411 B2
(45) Date of Patent: Jun. 16, 2020

(54) CABLING CONFIGURATIONS FOR HOLLOW CORE OPTICAL FIBERS

(71) Applicant: OFS Fitel, LLC, Norcross, GA (US)

(72) Inventors: David J DiGiovanni, Mountain Lakes, NJ (US); Daryl Inniss, Alpharetta, GA (US); Brian Mangan, Hopewell, NJ (US); Vitaly Mikhailov, Oxford, NJ (US); John E Pacini, Glastonbury, CT (US); Tristan Kremp, Somerset, NJ (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 16/475,531

(22) PCT Filed: Apr. 5, 2018

(86) PCT No.: PCT/US2018/026713
§ 371 (c)(1),
(2) Date: Jul. 2, 2019

(87) PCT Pub. No.: WO2018/187806
PCT Pub. Date: Oct. 11, 2018

(65) Prior Publication Data
US 2020/0025999 A1    Jan. 23, 2020

Related U.S. Application Data

(60) Provisional application No. 62/482,900, filed on Apr. 7, 2017.

(51) Int. Cl.
*G02B 6/02* (2006.01)
*G02B 27/00* (2006.01)

(52) U.S. Cl.
CPC ..... *G02B 6/02328* (2013.01); *G02B 27/0012* (2013.01)

(58) Field of Classification Search
None
See application file for complete search history.

(56) References Cited

U.S. PATENT DOCUMENTS 7,366,388 B2 * 4/2008 Roberts ............... C03B 37/0122
    385/125
7,415,206 B1 * 8/2008 Birk ..................... H04B 10/071
    398/21

(Continued)

*Primary Examiner* — Rhonda S Peace
(74) *Attorney, Agent, or Firm* — Wendy W. Koba, Esq.

(57) ABSTRACT

A hollow core optical fiber and cable combination is configured to exhibit minimal SNR and loss degradation. This is achieved by either: (1) reducing the coupling between the fundamental and other (unwanted) modes propagating within the hollow core fiber, or (2) increasing the propagation loss along the alternative. The first approach may be achieved by designing the cable to minimize perturbations and/or designing the hollow core fiber to fully separate the fundamental mode from the unwanted modes so as to reduce coupling into the unwanted modes. Whether through fiber design or cable design, the amount of light coupled into unwanted modes is reduced to acceptable levels. The second approach may be realized through either fiber design and/or cable design to suppress the light in unwanted modes so that an acceptably low level of light is coupled back into the fundamental mode.

15 Claims, 8 Drawing Sheets

(56) References Cited

U.S. PATENT DOCUMENTS

| | | | |
|---|---|---|---|
| 7,542,645 B1* | 6/2009 | Hua | G02B 6/02366 |
| | | | 385/123 |
| 9,442,246 B2* | 9/2016 | Brunet | G02B 6/03611 |
| 9,507,084 B2* | 11/2016 | Fini | G02B 6/0285 |
| 9,658,393 B2* | 5/2017 | Digiovanni | C03B 37/01217 |
| 2005/0185908 A1* | 8/2005 | Roberts | C03B 37/0122 |
| | | | 385/125 |
| 2015/0104131 A1* | 4/2015 | Fini | G02B 6/02323 |
| | | | 385/29 |
| 2015/0104139 A1* | 4/2015 | Brunet | G02B 6/03611 |
| | | | 385/124 |
| 2015/0198764 A1* | 7/2015 | Digiovanni | C03B 37/01217 |
| | | | 385/125 |
| 2015/0293300 A1* | 10/2015 | Fini | G02B 6/0285 |
| | | | 385/124 |
| 2019/0107670 A1* | 4/2019 | Kremp | G02B 6/02328 |
| 2020/0025999 A1* | 1/2020 | DiGiovanni | G02B 27/0012 |

* cited by examiner

10

40

20

50

CABLING CONFIGURATIONS FOR HOLLOW CORE OPTICAL FIBERS

CROSS-REFERENCE TO RELATED APPLICATIONS

This application claims the benefit of U.S. Provisional Application No. 62/482,900, filed Apr. 7, 2017, and herein incorporated by reference.

TECHNICAL FIELD

The present invention relates to hollow core optical fibers and, more particularly, to specific combinations and configurations of hollow core optical fibers and the associated outer cable structure best-suited for particular applications.

BACKGROUND OF THE INVENTION

Hollow core optical fiber is a powerful technology platform offering breakthrough performance improvements in sensing, communications, higher-power optical pulse delivery, and the like. Indeed, inasmuch as its latency is almost equal to the propagation of an optical wave in a vacuum, the hollow core optical fiber offers an attractive solution for data centers, high-frequency stock trading communication links, distributed computing environments, high performance computing, etc. In the stock trading application, for example, the hollow core optical fiber is contemplated as allowing for decreased data transmission times between trading computers, enabling trading programs to complete programmed trading transactions more quickly.

While there has been much progress on developing hollow core fibers capable of meeting stringent low latency requirements, the field deployment of such fibers has been found to be compromised by multipath interference (MPI), which is caused by the fact that hollow core fiber is intrinsically multimode. Moreover, since the index of refraction of the higher-order modes (HOMs) and surface modes are significantly different that the index of refraction of air, these HOMs are affected differently by perturbations within the fiber (and are therefore a source of MPI). The presence of MPI results in power fluctuations that render the transmitted signal unrecoverable. Indeed, it is been found that the act of "cabling" such fibers ("cabling" referring to the fabrication process of covering the fiber (or collection of fibers) within multiple layers of protective material) introduces (at times) catastrophic degradation. It appears that one or more failure mechanisms is related to perturbations impressed on the fiber by the cable structure itself.

Thus, a need remains in the art for providing a combination of hollow core optical and suitable cable structure that does not degrade signal transmission due to signal interference effects. More particularly, a need remains to provide a hollow core optical fiber cable assembly that minimizes the presence of MPI along the individual hollow core optical fibers.

SUMMARY OF THE INVENTION

The present invention addresses the needs in the art and is directed to ascertaining specific combinations and configurations of hollow core optical fibers and outer cable structures that are best-suited for particular applications.

In accordance with one or more embodiments of the present invention, an optical cable comprising one or more individual hollow core optical fibers is specifically designed with an understanding of the sources of MPI for a specific hollow core fiber design, and then designing a cable structure that either reduces the impact of mode coupling (for example, by increasing HOM loss without unduly impacting fundamental mode loss) or, alternatively, does not introduce additional mode mixing in fiber configurations that have been designed to exhibit minimal (acceptable) mode mixing.

Various embodiments of the present invention may utilize different types of hollow core optical fiber, including high-birefringent hollow core optical fiber, higher-order-mode (HOM) suppressing hollow core optical fiber, or various combinations of these types of fibers that are capable of minimizing unwanted modes (including HOMs, polarization modes, surface modes, and the like). These various embodiments are then paired with a selected cable design that either further reduces mode mixing (or the impact of mode mixing) or does not introduce additional mixing. In some embodiments, selected cables may be configured to minimize perturbations present along the cabled fiber. In other embodiments, selected cables may be configured to introduce a predetermined level of perturbation (e.g., using bend-induced perturbations) to preferentially attenuate unwanted modes, thus reducing MPI. The specific cable designs are selected from, for example, slotted-core cables, loose buffer cables, tight buffer cables, and loose-tight buffer cables. Specific parameters of each of these types of cables are particularly configured for a given application to address problems associated with mode mixing. For example, fiber bend along a stranded cable is a parameter that affects the mode mixing within the fiber (bend-induced perturbations) and is defined by pitch length, pitch radius, and pitch angle of the fibers within the cable configuration.

Indeed, an exemplary embodiment of the present invention takes the form of a method of configuring an optical fiber cable assembly including at least one hollow core optical fiber. This exemplary embodiment comprises the following: determining a maximum allowable MPI level permitted in a final cable assembly and selecting a hollow core fiber and cable configuration suitable for maintaining MPI below the determined maximum allowable level. If the selected hollow core fiber configuration is sensitive to mode mixing and is therefore not likely to exhibit MPI within acceptable limits, the method includes selecting a cable design that intentionally introduces perturbations sufficient to reduce MPI. If the MPI of the fiber is within acceptable limits, then the method performs the step of selecting a cable design that maintains MPI below the determined maximum allowable level. This includes selecting a cable design that reduces perturbations on the fiber to inhibit mode mixing.

Other and further embodiments and aspects of the present invention will become apparent during the course of the following discussion and by reference to the accompanying drawings.

BRIEF DESCRIPTION OF THE DRAWINGS

Referring now to the drawings.

DETAILED DESCRIPTION

As will be discussed in detail below, the present invention relates to assessing the properties of various types of hollow core optical fibers and cabling structures, and determining an optimum combination of fiber type and cable structure that is particularly well-suited for a given application. For example, the transmission of optical signal light along an "air" core (as is the case for various configurations of hollow core fiber) provides for transmission speeds that are 30% greater than that associated with standard silica core optical fibers. As mentioned above, this feature has particular applications to high-frequency trading companies, which rely on low latency communication links. Low latency also has applications in datacenter/supercomputer applications, where hundreds of kilometers of optical cables are used to interconnect thousands of servers.

The specific structure of the cable used to encase these hollow core fibers has been found to impact their performance, at times to the point where a specific data transmission rate specification cannot be met. One goal of the present invention is to determine a proper hollow core fiber and cable combination that minimizes signal impairments such that the final cable assembly is acceptable for use in low latency applications. Inasmuch as a given hollow core fiber may exceed a given specification in its "bare fiber" form, but then fail the same test when packaged within a cable, it is important for the combination of fiber and cable structure to be better understood and designed as a symbiotic component.

It is believed that a significant source of poor performance of cabled hollow core fibers resides from cable-created perturbations that are impressed on the fiber and introduce mode mixing. The present invention addresses this problem, offering solutions that include either carefully designing a hollow core fiber that does not support the propagation of multiple modes, more specifically rapidly attenuates unwanted modes as they propagate along the fiber (perhaps with a specific cable structure that ensures the maintenance of the singlemodedness), or utilizing a hollow core fiber that may not have high attenuation of unwanted modes (e.g., higher-order modes (HOMs), polarization-dependent modes, or surface modes) and creating a cable structure that is able to reduce them to acceptable levels. In the case of fibers that are designed to have rapid attenuation of unwanted modes, the cable should be designed to minimize mode mixing (i.e., control perturbations).

Figure 1:
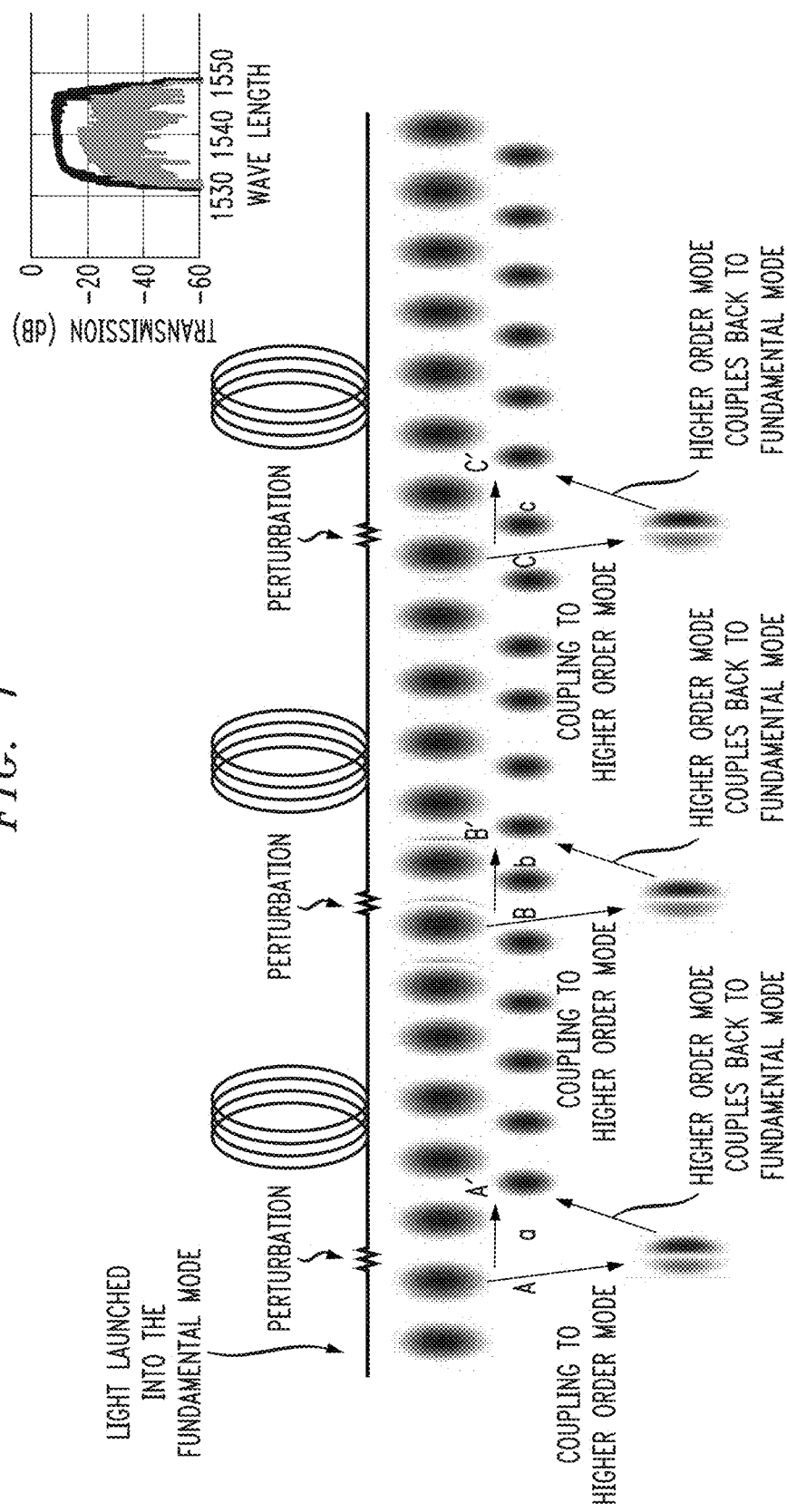
FIG. 1 is a diagram depicting the evolution of multipath interference (MPI) along a hollow core optical transmission fiber.

More particularly, a source of problems in cabled hollow core fibers results from MPI, as mentioned above. FIG. 1 depicts an exemplary hollow core optical fiber transmission line experiencing MPI. As shown, MPI originates when an optical signal propagating in the fundamental ($LP_{01}$) mode couples into other fiber modes (e.g., HOMs, surface modes), shown in positions A, B and C in FIG. 1. At a later point along the transmission line, these "other-moded" signals may then couple back into the fundamental mode (where random phasing occurs). This process repeats all along the transmission line to an endpoint termination of the fiber. It is important to note that when the diverted signal is coupled back to the fundamental mode signal, it is impossible to separate them and remove the unwanted signal copy.

When a portion of the propagating signal is coupled into one of the unwanted modes, its phase and/or amplitude may be delayed (relative to the original signal) if there is a difference in the phase and/or group velocity of the different modes. This delay results in interference between the signal and the unwanted signal copy. Additionally, the unwanted mode(s) signal can be preferentially attenuated if the loss experienced by the signal propagating in the fundamental modes and the signals propagating in the unwanted modes are different. Inasmuch as the signal that propagates through all of the alternative modes has random attenuation delay and phase shift, and since there are many alternative modes and re-coupling events during signal transmission, it can be considered that the signal reaching the far-end termination of the transmission line exhibits added "noise", not deterministic distortion. Intensity noise caused by distributed multipath interference of different modes is described by S. Ramachandran et al. in the paper entitled "Measurement of multipath interference in the coherent crosstalk region", published in IEEE Photonics Technology Letters, Vol. 15, No. 8, August 2003. As indicated in that work, the presence of MPI can be detected by measuring the attenuation spectrum of the fiber with a narrow linewidth swept-wavelength source.

The presence of MPI, therefore, affects both the reach and the bandwidth of the cabled hollow core transmission fiber. As is well known in the art, the acceptable level of MPI to provide a minimum bit error rate in a transmission link depends on many factors, including bit rate, signal format, the nature of the transceiver, and the desired system margin.

Thus, the problems related to MPI in a hollow core fiber can be described in terms of signal-to-noise ratio (SNR) evolution and be divided into three stages: (1) coupling into the alternative mode(s), shown as points A, B, and C in FIG. 1; (2) propagating along the alternative mode(s), shown as lengths a, b, and c in FIG. 1; and (3) re-coupling back into the original path of the fundamental mode signal, shown as points A', B', and C' in FIG. 1. In terms of SNR degradation, the initial coupling into the unwanted mode(s) reduces the remaining signal power propagating along the main signal path in the fundamental mode. The following propagation of the unwanted mode(s) along the alternative paths does not directly impact SNR. Lastly, the re-introducing of the signals propagating along alternative paths into the main signal path of the fundamental mode causes coherent cross-talk among co-propagating modes that increases the noise, as mentioned above, and is considered as the main source of SNR degradation (since it directly transfers the signal power to the noise power).

It is also to be noted that the coupling mechanism is reciprocal. That is, when there is a condition to couple from the fundamental mode to other modes (e.g., phase matching) there also exists a condition to couple the light back from other modes (i.e., the first and third stages always happen simultaneously).

Hollow core optical fiber experiences all of these problems in ways that are very different than in conventional silica core fibers. In hollow core optical fiber, the index difference between the fundamental mode and other unwanted modes (both HOMs and surface modes) is much higher than that of conventional silica fibers. As a result, there may be more of an environmentally-dependent phase shift in hollow core optical fibers, necessitating higher attenuation of unwanted modes than in conventional solid core fiber.

Figure 2:
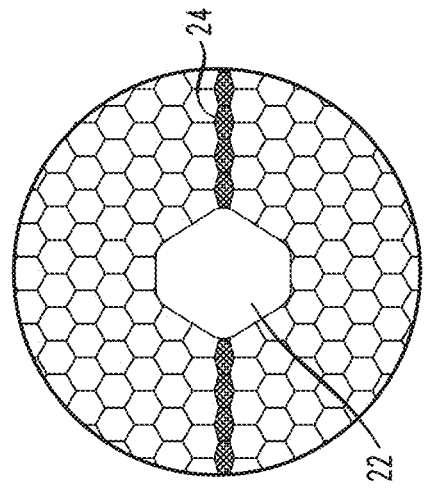
FIG. 2 is a schematic view of an exemplary hollow core optical fiber.

In light of all of this, a goal of the present invention is to design a fiber and cable combination with minimal SNR and loss degradation. This can be achieved, as will be described in detail below, by either: (1) reducing the coupling between the fundamental and other modes (i.e., reduction of the first and third stages of MPI, as defined above); or (2) increasing the propagation loss along the alternative paths (i.e., during the second stage, as defined above). The first approach can be achieved, in accordance with the principles of the present invention, by designing the cable to minimize perturbations and/or designing the hollow core fiber to fully separate the fundamental mode from the unwanted modes so as to reduce coupling into the unwanted modes. Whether through fiber design or cable design, the amount of light coupled into unwanted modes is reduced to acceptable levels. The second approach can be realized through either fiber design and cable design to suppress the light in unwanted modes so that an acceptably low level of light is coupled back into the fundamental mode. Referring now to FIG. 2, there it shows a schematic cross section view depicting basic features of a typical prior art hollow core fiber 10. In particular, the hollow core fiber shown in FIG. 2 comprises a cellular structure where an individual cell C includes a cellular space S and a cell wall W enclosing the cellular space. The individual cells are of substantially similar nominal dimensions, cell wall thickness and chemical composition. The cells in this example are shown to be in a honeycomb pattern; however, cells having other geometrical shapes and pattern are not precluded. Adjacent cells are generally connected at the cell walls and distributed in a lattice pattern (also referred to at times as a cellular lattice or a web of cells) having a substantially uniform lattice spacing (substantially similar nominal spacing between the centers of adjacent cells). The lattice pattern in general, is uniform and regular. For ease of discussion, the cells comprising the cellular lattice will be referred as regular cells hereinafter.

The cellular lattice functions as an inner cladding extending up to a pre-determined radial distance and the outer edge of the cladding is surrounded or enclosed in another outer cladding (not shown). A contiguous group of intentionally omitted regular cells arranged in a predetermined regular pattern in the cellular lattice, comprise a hollow core 12. The size and shape of hollow core 12 is determined respectively by the number and arrangement of omitted cells. The dimension and shape of the hollow core is often described in terms of the number of missing cells (13 cell, 17 cell, 19 cell, 33 cell, and so forth). While the hollow core in this example is approximately a hexagon placed at the center of the cellular lattice, different shapes and/or placement is not precluded. For example, a hollow core may be circular and be placed symmetrically or asymmetrically within the cellular lattice structure. The light to be transmitted in the hollow core is confined and guided in the hollow core by the photonic bandgap resulting from the periodic structure of the cellular matrix outside the hollow core (a concept similar to electronic band gap in a semiconductor crystal).

The hollow core functions as a transmission waveguide supporting predominantly a single, preferably a fundamental mode, but other modes including one or more HOMs that may be a signal mode or an unwanted mode may also be present in the hollow core. In the example of a hollow core fiber shown in FIG. 2, hollow core 12 is disposed to exhibit reflection symmetry along one or both orthogonal axes passing through the core. However, hollow cores having different reflection symmetries have been used to selectively impart a desired transmission characteristic for example, a preferred polarization mode, selective loss of an undesired core mode such as a higher order mode (HOM), etc.

Figure 3:
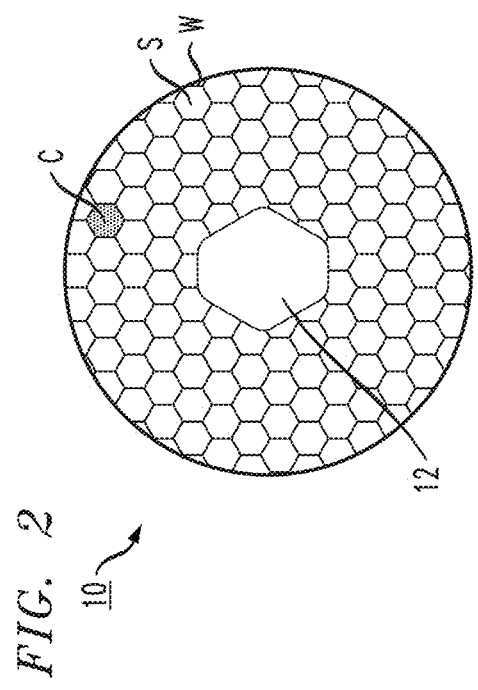
FIG. 3 is a schematic of an alternative hollow core optical fiber, configured as a polarization selective hollow core fiber.

In particular, FIG. 3 shows a schematic cross section of a polarization selective hollow core optical fiber 20. Similar to fiber 10 of FIG. 2, an inner cladding comprises a cellular lattice. More specifically, the cellular lattice includes cells having a cellular space S and a cell wall W. The cells are connected at the cell walls and distributed in a lattice pattern similar to what is described in reference with FIG. 2. The cellular lattice has a regular pattern of cells that may approximate a triangular lattice, rectangular lattice, honeycomb lattice, or other well-known lattice patterns. A contiguous group of intentionally omitted regular cells arranged in a predetermined regular pattern in the cellular lattice, comprise a hollow core 22. Omission of cells in the hollow core region locally disrupts the continuity of the lattice structure only in the core region while retaining the lattice structure around the core. The pattern of cells around the core region may correspond to an ideal (e.g., triangular) pattern, or have a distortion pattern (e.g., triangular lattice distorted by enlargement of the core).

In the case of polarization selective hollow core optical fiber, 20 a predetermined set of the regular cells in the cellular lattice are substituted with a corresponding set of a different type of cell(s) 24 shown shaded in this view (only one labeled for clarity). The substituted cells (also referred to as "leakage cells") in general, replace a regular cell at a nominal lattice site. The leakage cells differ from the regular cells in at least one physical and/or chemical aspect. For example, in the embodiment shown in FIG. 3, the leakage cells 24 are of a different shape and size. More specifically, leakage cells in this group are collapsed or compressed in the vertical direction (referring to the figure) relative to nominal dimension of the regular cells. Alternatively, the leakage cells may be generated by expanding a regular cell from their nominal dimension. It should be understood that leakage cells do not disrupt the lattice pattern in general but it may cause a distortion in the lattice pattern, particularly if the leakage cells substantially differ in physical dimensions from the regular lattice cells.

In a variant aspect, leakage cells are often placed along a line segment between the core-cladding interface and the outer edge of the cladding. For example, the leakage cells may be centered on the line segment, or they may just touch the line segment (on one or both sides). The leakage cells may be disposed along one symmetry axis of the fiber as shown in this example (FIG. 3). However, other distributions or patterns may be used to achieve desired transmission characteristics such as, polarization state, selective suppression of a mode, HOM suppression to name a few.

The leakage cells locally modify the properties of the cladding layer. Leakage cells are designed to collectively provide a leakage path in the cladding layer. A leakage path may extend across the cladding from the core-cladding interface towards the outer cladding as shown in FIG. 3. The fiber appears to be 'zipped' together, along a leakage path. More specifically, one or more leakage cells positioned close enough to each other in the cladding region provide one or more continuous leakage paths for some of the core modes by selectively coupling them to the cladding and provide optical coupling of selected core modes to the outer cladding boundary. Although FIG. 3 shows one type of a leakage path other possible options are not precluded. In any of these variations, a cladding structure that does not impart unwanted perturbations onto the created leakage paths is preferred (for example, a slotted core cable configuration or a loose tube buffer).

Figure 4:
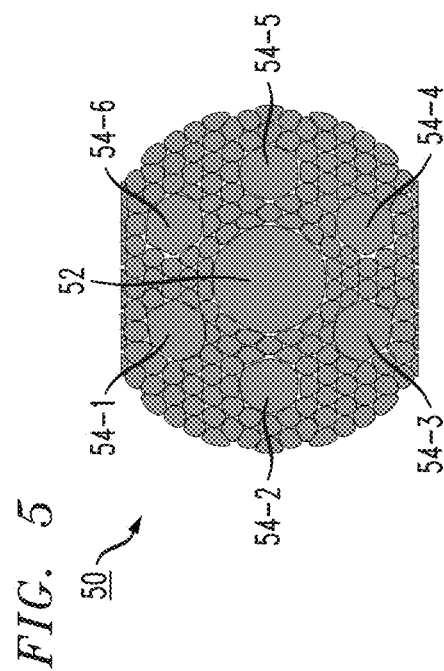
FIG. 4 is a schematic of an exemplary mode-suppressing hollow core optical fiber, in this case including a pair of shunt cores.

Beyond the basic hollow core optical fiber structures shown in FIGS. 2 and 3, there has been an increasing effort in developing configurations that suppress unwanted higher order modes. In particular, various types of hollow core fibers have been developed that incorporate additional hollow regions (often referred to as "shunt cores", or simply "shunts") that surround the core and function to out-couple HOMs from the central core region. The basic design of this configuration is shown in FIG. 4, where an HOM-suppressing hollow core fiber 40 has a cellular matrix structure of holes (voids) in an interconnected web of silica glass. Similar to the configurations shown in FIGS. 2 and 3, individual cells (matrix cells) in the web connect with neighboring cells at the cell walls (boundaries) that in general have uniform nominal thickness throughout the web. In a typical hollow core fiber, the cells are distributed in a regular periodic arrangement (in two dimensional physical space cross-section perpendicular to the axis of the fiber) with a uniform nominal spacing between the holes (substantially similar to a lattice spacing in a crystal). The cellular lattice has a regular pattern of cells that may approximate a triangular lattice, rectangular lattice, honeycomb lattice, or other well-known lattice patterns.

Figure 5:
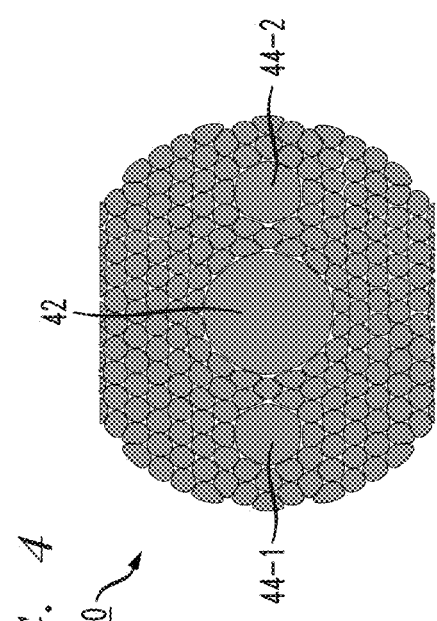
FIG. 5 is a schematic of an alternative configuration of a mode-suppressing hollow core optical fiber, in this case including a set of six shunt cores.

As with the configurations describe above, a central contiguous region of fiber 40 is devoid of the cellular matrix structure, defining a hollow core 42. Hollow core 42 extends along the length of fiber 40. The size (diameter) of hollow core 42 is determined by the number of cells (for example a 19-cell or a 7-cell core, etc.) that are contiguously missing in the core region. Specific geometry of the core (for example, elliptical, oblong, circular or hexagonal core shape) may be determined according to the required polarization and transmission properties desired for a particular application. Besides hollow core 42, mode-suppressing hollow core optical fiber 40 includes one or more hollow regions 44 disposed to surround hollow core 42 and also extend along the length of the fiber. The additional one or more hollow regions are in general smaller in size as compared to the core and often referred as shunt core(s) or simply shunts in this context. The configuration of FIG. 4 is at times referred to as a "tri-core", based on the arrangement of central hollow core region 42 and a pair of shunts 44-1 and 44-2. FIG. 5 illustrates an alternative configuration (referred to at times as a "hepta-core fiber"), where here a hollow core optical fiber 50 includes a central hollow core region 52 and a plurality of six separate shunts (labelled as 54-1, 54-2, . . . , 54-6) disposed to surround central hollow core 52. Other configurations are possible. The desired level of attenuation of the HOMs depends on the amount of light coupling such that the cross-coupled light is preferably less than −15 dB, and more preferably less than −30 dB, that of the signal. In typical hollow core fibers, this can be achieved with HOM attenuation of more than 7.5 dB/km, or more preferably more than 1 dB/m. In some instances, HOM attenuation of more than 40 dB/m is required.

MPI may also be caused by coupling to and from well-known surface modes; that is, light that propagates predominant within the glass regions surrounding the core. The nature of surface mode coupling is similar to HOM and polarization coupling. Because the modes have different propagation constants, a perturbation is required to provide phase matching to induce coupling, with the strength of coupling depending on the coupling coefficient and the perturbation magnitude. In the case of surface modes, the spatial period of the perturbation is similar to that which causes microbending in the conventional fiber. For many relevant modes which cause MPI, the perturbation length scale ranges from hundreds of microns, to millimeters, to centimeters. To maintain acceptable levels of MPI, surface mode attenuation should be greater than 0.1 dB/m, though in come cases, attenuation should exceed 0.3 dB/m.

It may be that such a fiber is sensitive to mode mixing; that is, various types of slight perturbations to the fiber (temperature variation, bending, microbending, spatially-varying strain, etc.) are sufficient to disturb the fiber's geometry such that the unwanted modes re-appear and increase MPI. If this is a possibility, embodiments of the present invention allow the utilization of a cable configuration (for example, a slotted cable) that imparts little or no perturbations to the fiber. Depending on the degree of sensitivity, other cable configurations (such as loose buffer or loose-tight buffer) may be sufficient. Various ones of these fiber and cable combinations are discussed in detail below.

Further, it may be that such a fiber is sensitive to mode mixing; that is, various types of slight perturbations to the fiber (e.g., temperature variation, microbending, bending, etc.) are sufficient to disturb the fiber's geometry such that the unwanted modes re-appear. If this is a possibility, embodiments of the present invention allow the utilization of a cable configuration that imparts a controlled level of perturbations to the fiber to attenuate the unwanted modes, reducing MPI. Various ones of these fiber and cable combinations are discussed in detail below.

Alternatively, it may be the case that such a fiber that is configured to eliminate unwanted modes is insensitive to mode mixing. For example, a high birefringent hollow core fiber (such as shown in FIG. 3) is not typically affected by perturbations and maintains its single mode (and single polarization) operation. For these situations, the specific structure of the cable itself is not as critical and various types of cabling (including tight buffer) may be used. It is to be noted, however, that if suppression of HOMs also results in increasing the loss of the propagating fundamental mode to an undesirable level, a cable configuration that intentionally introduces perturbations to the hollow core fiber may be a preferred alternative (for example, a cable configuration providing bend-induce perturbations).

In accordance with one or more other, alternative embodiments of the present invention, a hollow core optical fiber is configured to attenuate unwanted modes (instead of attempting to eliminate the coupling to unwanted modes), thus reducing the requirements on the cable structure to assist in minimizing mode mixing. In particular, one or more specific configurations of these alternative embodiments consists of using a hollow core fiber including one or more shunt cores (smaller in diameter than the main core) disposed around the core, such as depicted in FIGS. 4 and 5. As mentioned above, one needs to carefully configure these fibers including shunt cores to ensure that loss in the desired, fundamental mode is not significant. This fiber design further includes bend-induced perturbations to increase loss in the unwanted modes. In these cases, it is preferred to utilize a cable structure that increases HOM loss.

As mentioned above, the amount of perturbation experienced by a cabled hollow core optical fiber may be controlled by the configuration of the induced stress on the fiber itself in the final cable construction. Control of the induced stress is, in turn, achieved primarily through the design of the cable itself. For example, the hollow core fiber may be contained within a loose tube buffer cable construction, or a tight buffer cable construction, or even some combination of the two (referred to at times as a loose-tight buffer). One example cable design, specifically configured to minimize the possibility of perturbations on the hollow core fiber is the "slotted core" cable. Indeed, a loose tube buffer or slotted core cable will produce little or no perturbation while a loose-tight or tight buffer is known to produce higher amounts of perturbation on the hollow core fiber within the finished cable.

Figure 6:
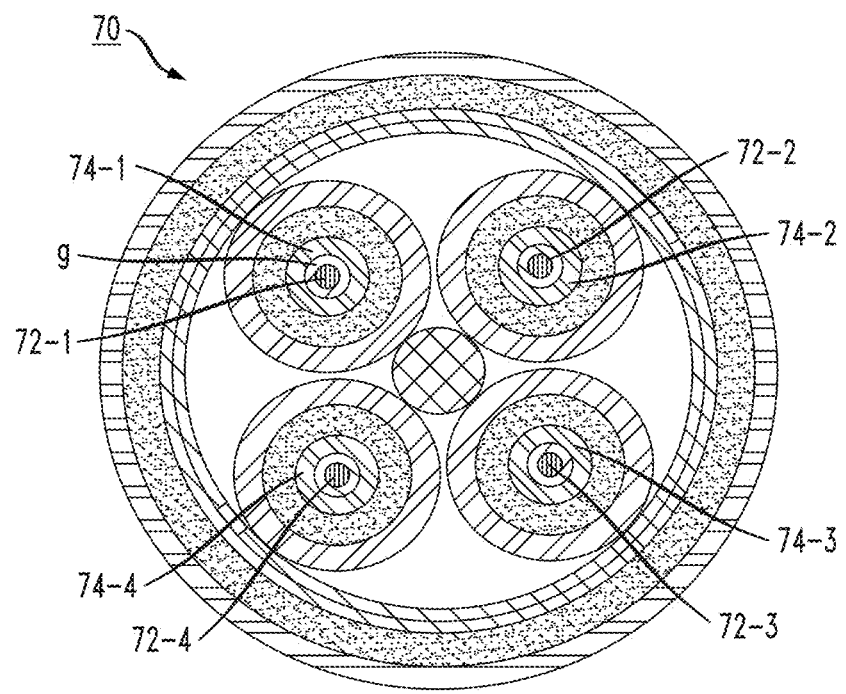
FIG. 6 depicts an exemplary cross-section view of a set of hollow core optical fibers within a cable structure, in this case using a loose tube buffer to surround each fiber.

FIG. 6 is a cross-section illustration of an exemplary cable 70 containing a set of four hollow core fibers 72 (specifically illustrated as 72-1, 72-2, 72-3 and 72-4). Each fiber 72 is surrounded by a buffer layer 74, which is applied over the finished (coated) fiber. For a "tight buffer" configuration, the material forming buffer layer 74 is tightly applied, leaving no air space between the coating on the fiber and the inner diameter of the buffer. The specific "tightness" of buffer 74 over fiber 72 can be controlled by the buffer material selection and the manufacturing process used to apply the "tight buffer" over the coated fiber.

A "loose tube" buffer, on the other hand, is achieved by allowing an air gap, by design and manufacturing process, to exist between the coated fiber and the ID of the buffer. The specific illustration of FIG. 6 shows such a gap "g" between hollow core fiber 72-1 and its associated buffer 74-1. This air gap may be filled with a water-blocking gel or swelling compound to prevent ingress of moisture or water, which is often required for outdoor installations of hollow core fiber cable. A "loose-tight" buffer is considered to be a specific type of "loose tube" buffer, where the amount of gap is somewhat reduced, thereby controlling the amount of perturbation on the hollow core fiber.

Figure 7:
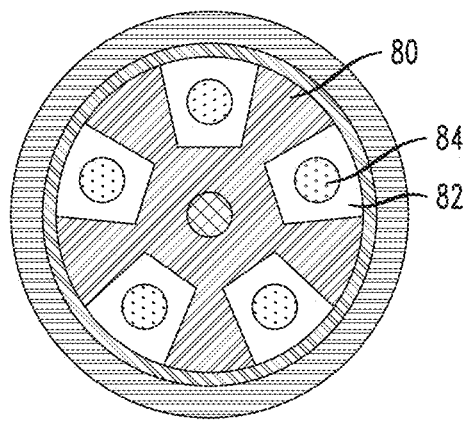
FIG. 7 is a cross-section view of an alternative cable structure, in this case a slotted core cable.
Figure 8:
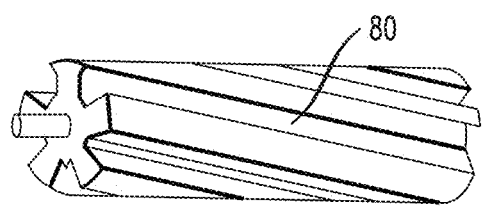
FIG. 8 is an isometric view of an exemplary slotted core for use in the structure of FIG. 7.

FIG. 7 depicts a cross-section of a slotted core cable, useful for applications of the present invention where it is desired to minimize perturbations felt by the hollow core fiber itself. FIG. 8 is an isometric view of a slotted core cable. Slotted core 80 may be configured to comprise multiple slots 82, with a separate hollow core fiber 84 disposed in each slot. For higher fiber count cables, more than one individual fiber may be disposed in each slot. As will be discussed in detail below, this cable configuration allows for the minimal amount of perturbation on the hollow core fiber. As with the loose tube cable construction, the free space within the slotted cable may be filled with water blocking gel or swelling compound when the finished cable is intended for use in an outdoor (or "wet" indoor) installation.

Figure 9:
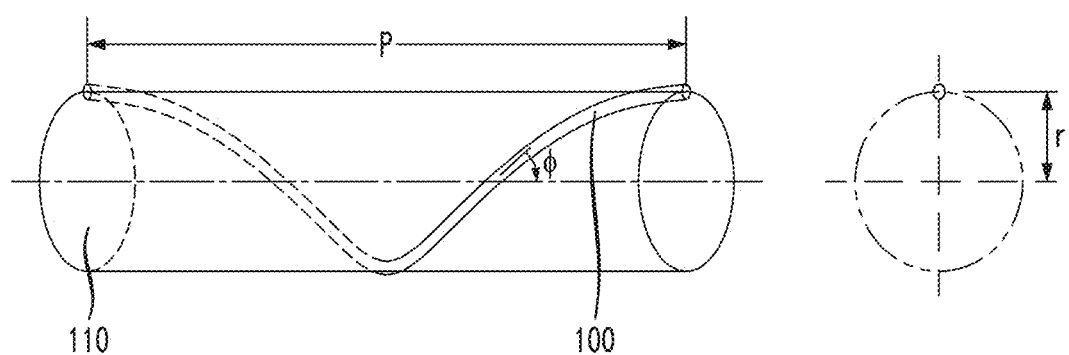
FIG. 9 is a simplified line diagram illustrating the parameters of pitch length, radius and angle, used in determining an amount of bend-induced perturbation introduced into a hollow core optical fiber by the surrounding cable structure.

FIG. 9 is a simple line drawing showing how fiber bend can be designed into a stranded cable to control bend-induced perturbation of the hollow core fibers within the cable. Here, a single hollow core optical fiber 100 is shown as stranded (wrapped) a single time around a cylinder 110. The fiber itself may be contained within a loose tube buffer, tight buffer, or slotted core. Cylinder 110 may be a central strength member of a required diameter to provide the necessary mechanical strength to the finished cable construction, with the required spacing between multiple, buffered hollow core optical fibers stranded (or wrapped) around cylinder 110. Cylinder 110 typically comprises a composite material of epoxy-glass or aramid-glass, or a solid steel wire.

As mentioned above, one or more embodiments of the present invention may utilize a specific bend-induced perturbation of the hollow core optical fibers, provided by the cable structure, to control the amount of mode mixing present in the final assembly such that the power level of the fundamental mode does not drop below an unacceptable level. The bend-induced perturbation of a hollow core fiber is achieved by controlling the pitch length ρ, pitch radius r, and pitch angle ϕ of the fibers within the cable configuration. The pitch angle ϕ in a given cable configuration is expressed as:

$$\sin\phi = \frac{2\pi r}{\sqrt{(2\pi r)^2 + \rho^2}}.$$

Further, the bend radius α and the radius of curvature β of a hollow core optical fiber is indicated as follows:

$$\alpha = \frac{1}{\beta} = \frac{r}{\sin^2\phi}.$$

For a given cable configuration with a pitch radius r, the perturbation on an included hollow core fiber can be increased by decreasing the pitch length ρ, which thereby increases the pitch angle ϕ. When the pitch angle ϕ is increased, the bend radius α of the fiber decreased, thereby increasing the radius of curvature β of the hollow core fiber within the final cable structure. Bend-induced perturbations on a hollow core fiber may be decreased by increasing the pitch length p for a given cable construction.

Figure 10:
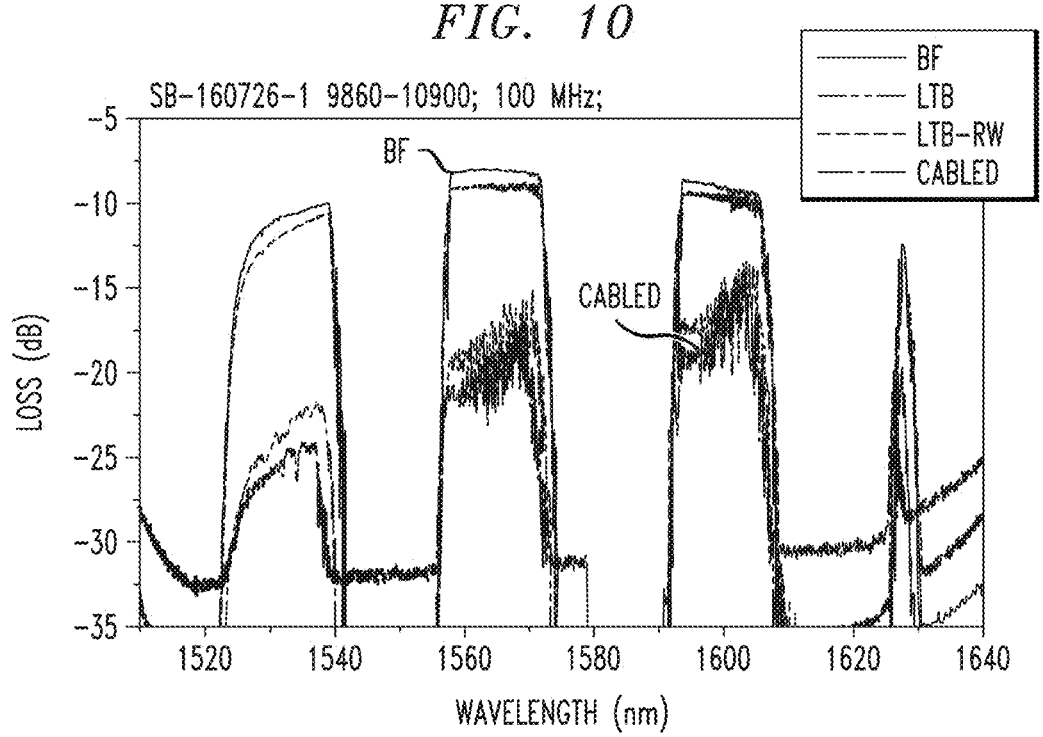
FIG. 10 is a transmission spectrum showing that cross-coupling of modes results in large variation with wavelength of the detected signal.
Figure 11:
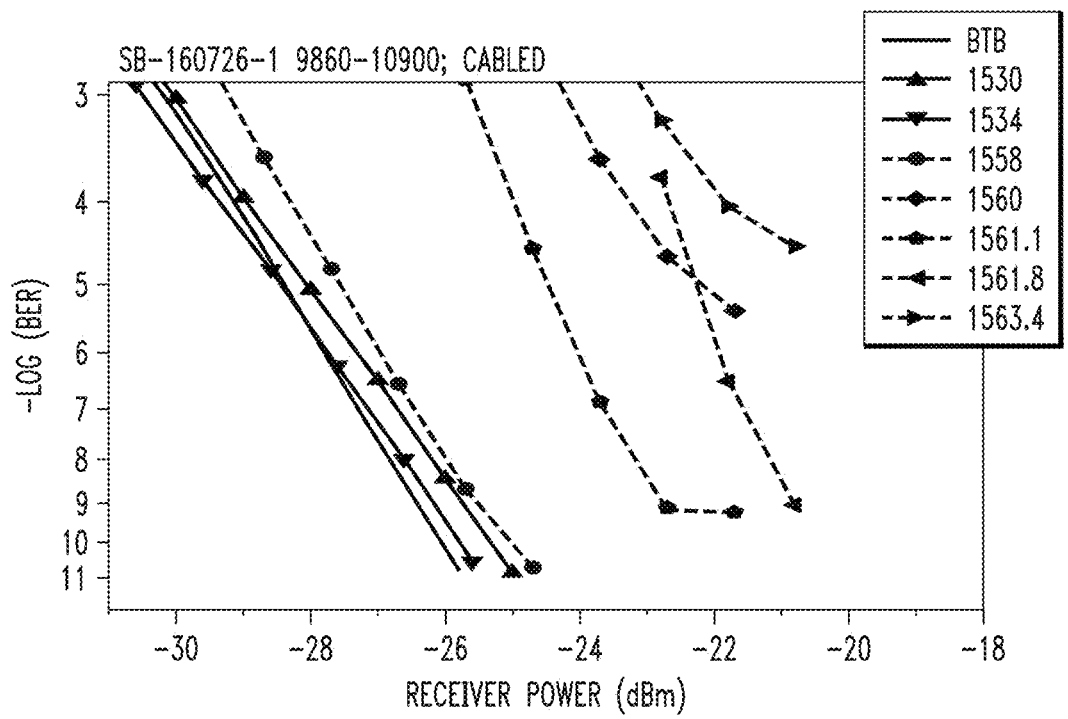
FIG. 11 shows the bit error rate (BER) of a signal transmitted through the cabled fiber of FIG. 10.

The impact of MPI and cabling is illustrated in FIGS. 10-14. FIG. 10 is a transmission spectrum made using a swept-wavelength source. As described above, cross-coupling of modes results in large variation with wavelength of the detected signal. In this example, bare fiber (curve BF) shows very little variation as a function of wavelength, while the cabled fiber shows significant reduction in overall transmission and large wavelength variation. FIG. 11 shows the bit error rate (BER) of a signal transmitted through the cabled fiber. At a wavelength of 1530 nm where transmission has relatively low variation (i.e., a few dB), BER is similar to the back-to-back (BTB) value while wavelength variation of more than about 5 dB causes significant BER penalty. In this example, while the bare fiber performs well, cabling has induced excessive perturbation that causes MPI and degrades transmission.

Figure 12:
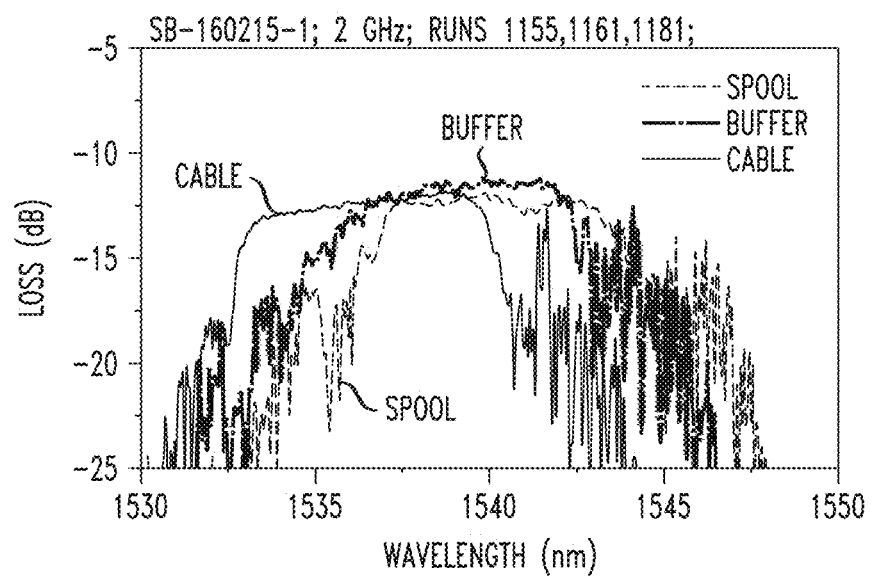
FIG. 12 illustrates an improvement of the linearity in the transmission spectrum for cabled fiber vs. spooled fiber for an alternative fiber configuration.
Figure 13:
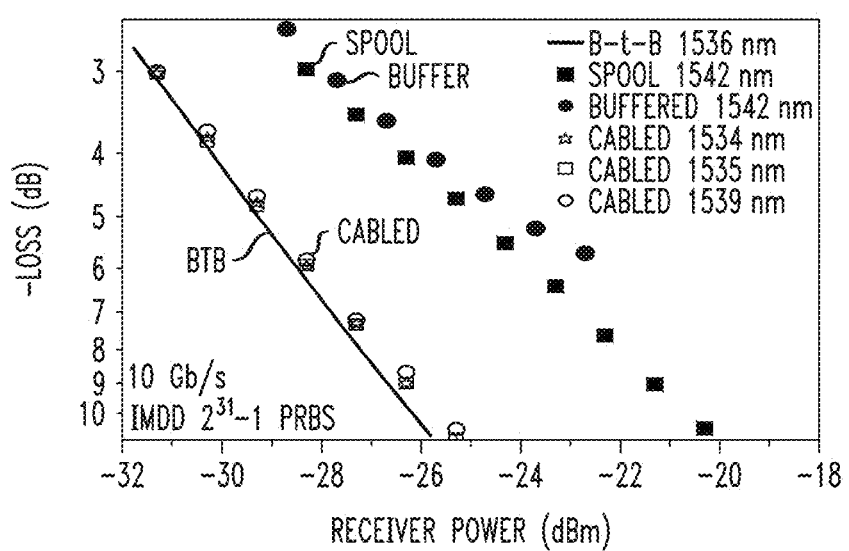
FIG. 13 illustrates how the cabling in this particular configuration of FIG. 12 improves the BER, to a value very similar to the BTB configuration.

FIGS. 12 and 13 show an alternative example that demonstrates that proper cabling can improve that transmission characteristics compared to a spooled fiber. In this example, the fiber is sensitive to polarization-dependent effects (differential group delay—DGD) and is perturbed by overwinds and marobending on the spool but proper cabling eliminates unwanted polarization effects. In particular, FIG. 12 illustrates an improvement of the linearity in the transmission spectrum for the cabled fiber vs. the spooled fiber. FIG. 13 illustrates how the cabling in this particular configuration improves the BER, to a value very similar to the BTB configuration.

Figure 14:
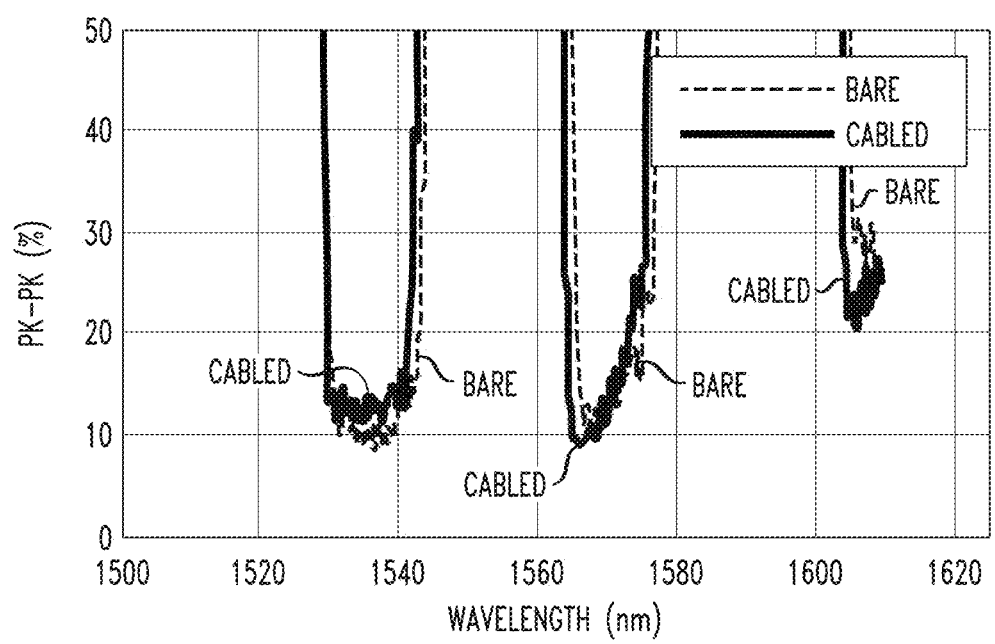
FIG. 14 shows the peak-to-peak transmission variation as a function of wavelength of fiber.

FIG. 14 shows the peak-to-peak transmission variation as a function of wavelength of fiber that is relatively robust to perturbations and has acceptable performance when spooled bare with both overwinding and macrobending. It is clear that the performance is essentially unchanged after cabling. Peak-to-peak variation of about 10%, and in some cases up to 20%, is acceptable for signal transmission links.

As mentioned above, an aspect of the present invention relates to providing an optical cable comprising one or more individual hollow core optical fibers that is specifically configured with an understanding of the sources of MPI for a specific hollow core fiber design, and then designing a cable structure that either compensates for an unacceptable amount of mode mixing in the fiber configuration or, alternatively, does not introduce additional mode mixing in fiber configurations that have been designed to exhibit minimal (acceptable) mode mixing.

Figure 15:
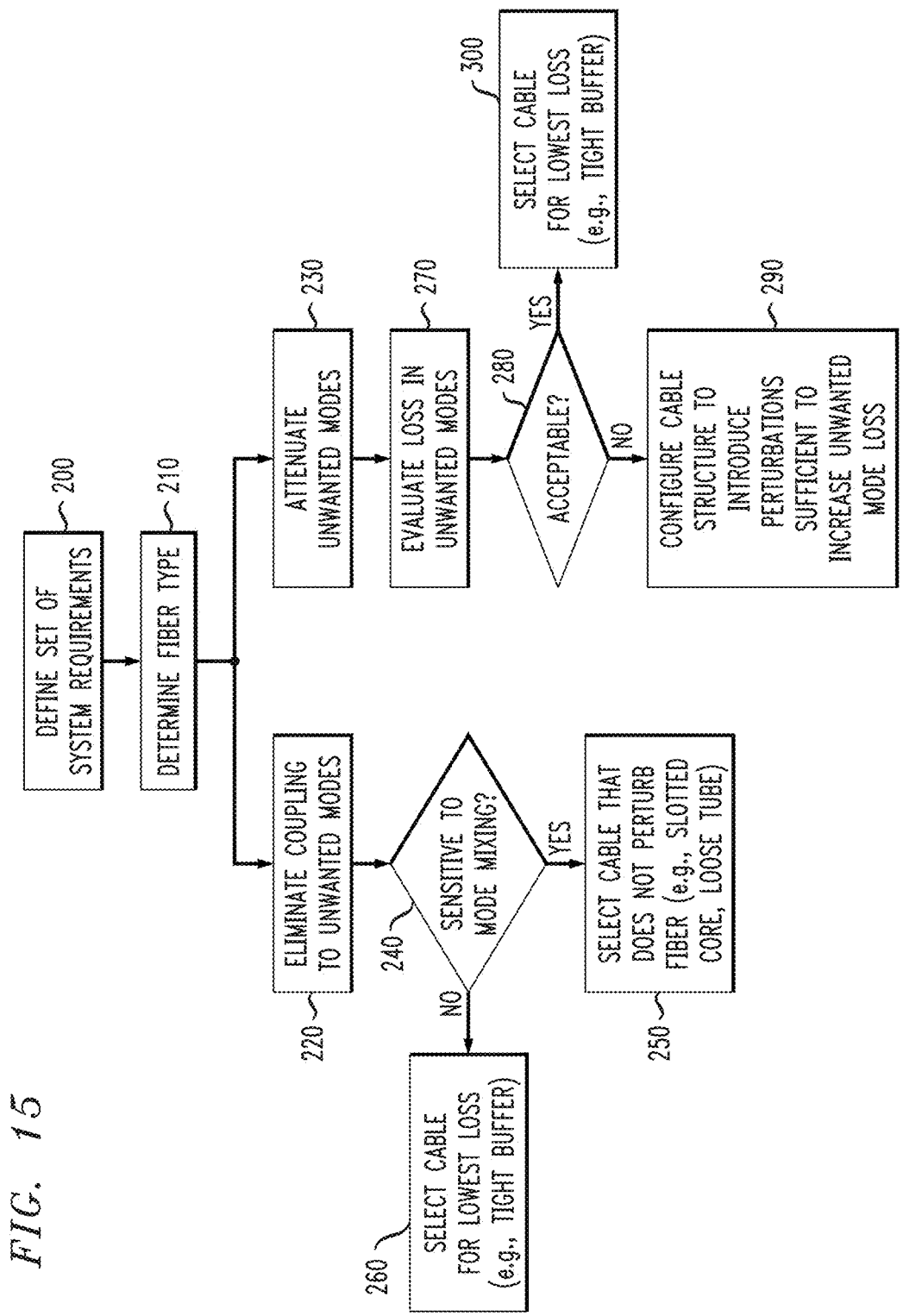
FIG. 15 is a flowchart illustrating a set of steps that may be followed in determining an optimum combination of hollow core optical fiber and cable structure in accordance with the present invention.

FIG. 15 is a flowchart outlining an exemplary set of steps that may be followed in selecting a specific hollow core optical fiber configuration and cable structure that meets these requirements. The process begins at step 200 by defining a set of system requirements necessary for a specific application. For example, a certain level of MPI may be one of the driving design parameters. Once this is established, the next step in the process is to determine the proper type of hollow core optical fiber that is best-suited for this application and the system requirements (step 210). In one particular methodology, a decision may be made at this point whether to select a hollow core fiber design that remains multi-moded, but is defined to eliminate coupling to unwanted modes (shown as element 220 in the flowchart), or a hollow core fiber that is formed to be mode-suppressing, such as by including shunt cores (shown as element 230 in the flowchart).

Following the path from element 220, the selected fiber is evaluated to determine its sensitivity to mode mixing (decision point 240). If the fiber is sensitive to mode mixing, a cable structure is then selected (step 250) that imparts little or no perturbations on the fiber (e.g., slotted core cable, loose buffer cable). Returning to decision point 240, if the fiber is insensitive to mode mixing, a tight buffer cable may be selected (step 260).

Returning to element 230 in the flowchart, once the decision has been made to use a mode-suppressing hollow core fiber design, the next step in the design process is to ascertain how much loss is found in the unwanted modes (step 270), and to decide if the amount of loss is acceptable (decision point 280). If the loss is acceptable, any suitable cable structure may be employed (step 300). However, if the amount of loss in the unwanted modes is too low, a cable structure cable of introducing perturbations along the fiber is a proper selection (step 290).

It is to be understood that the methodology outlined in FIG. 15 is exemplary only, and various other considerations may be added to the decision-making process. For example, the selected combination of fiber and cable should not degrade other fiber parameters (i.e. should not introduce a large amount of DGD or an excessive amount of fundamental mode loss). Since high overall coupling may come from relatively low local coupling monotonically distributed along the fiber length, and the coupling process is typically reciprocal, the light will be coupled continuously between the fundamental mode and the unwanted modes. This may result in an MPI-like penalty, even in the central launch (i.e., butt-coupled) case, or in the presence of a mode filter at the far-end termination of the hollow core fiber cable. In this case, either the mode coupling should be reduced to achieve the desired crosstalk level, or an additional unwanted mode loss mechanism should be introduced.

What is claimed is:

1. A method of configuring an optical fiber cable assembly including at least one hollow core optical fiber, comprising:
   determining a maximum allowable multi-path interference (MPI) level permitted in a final cable assembly;
   selecting a hollow core fiber configuration suitable for maintaining the MPI level below the determined maximum allowable level;
   if the selected hollow core fiber configuration is sensitive to mode mixing,
   selecting a cable design that intentionally introduces perturbations on the fiber sufficient to reduce the MPI below the maximum allowable level in the presence of mode mixing sensitivities; otherwise, if the selected hollow core fiber is insensitive to mode mixing,
   selecting a cable design that maintains the MPI level below the determined maximum allowable level.

2. The method as defined in claim 1 wherein the step of selecting a hollow core fiber configuration includes selecting a hollow core fiber from the group consisting of: polarization-maintaining hollow core optical fiber and a mode-suppressing hollow core optical fiber.

3. The method as defined in claim 1 wherein the step of selecting a cable design includes selecting a cable selected from the group consisting of: slotted core, loose tube, loose-tight buffer, tight buffer.

4. The method as defined in claim 1 wherein the step of selecting a cable design that intentionally introduces perturbations comprises selecting a cable design that creates bend-induced perturbations.

5. The method as defined in claim 4 wherein the bend-induced perturbations are determined by controlling a pitch length ρ, a pitch radius r, and a pitch angle φ of the hollow core fiber within the cable configuration assembly, where the pitch angle φ in a given cable assembly is expressed as:

$$\sin\phi = \frac{2\pi r}{\sqrt{(2\pi r)^2 + \rho^2}},$$

and
the bend radius α, sand the radius of curvature β of the hollow core optical fiber is indicated as follows:

$$\alpha = \frac{1}{\beta} = \frac{r}{\sin^2\phi}.$$

6. A device configured to maintain multipath interference (MPI) below a predetermined maximum value, including:

a multimode hollow core fiber (HCF) supporting the propagation of a first mode exhibiting an MPI value, wherein the multimode MCF performs at least one of eliminating mode coupling between the first mode and one or more unwanted modes, and attenuating the one or more unwanted modes; and a cable structure housing the multimode HCF in accordance with a fiber-cable configuration such that MPI is maintained below the predetermined maximum value.

7. The device as defined in claim 6, wherein the fiber-cable configuration does not perturb the multimode HCF when the multimode HCF eliminates mode coupling and the multimode HCF is sensitive to mode mixing.

8. The device as defined in claim 6, wherein the fiber-cable configuration does not affect perturbations in the multimode HCF and maintains the MPI value below the predetermined value when the multimode HCF attenuates the unwanted mode.

9. The device as defined in claim 6 wherein the cable structure introduces perturbations to the multimode HCF when the unwanted mode attenuation of the HCF is insufficient to maintain MPI below the predetermined maximum value.

10. The device as defined in claim 6, wherein the first mode is a fundamental mode and the one or mode unwanted modes includes once or more higher order modes (HOMs), polarization modes, and surface modes.

11. The device as defined in claim 6, wherein the cable structures features one of a slotted-core cable structure, a loose tube buffer cable structure, a tight buffer cable structure, and a loose-tight buffer cable structure.

12. The device as defined in claim 6, wherein the fiber-cable configuration includes at least one of a pitch length value, a pitch radius value, and a pitch angle value of the multimode hollow core fiber within the cable structure.

13. The device as defined in claim 6, wherein the fiber-cable configuration affects perturbation by reducing a lever of mode mixing.

14. The device as defined in claim 6, wherein the fiber-cable configuration affects perturbation by introducing a predetermined level of perturbation to reduce the MPI value.

15. The device as defined in claim 6, wherein the perturbation includes bend-induced perturbations.

* * * * *